United States Patent [19]

Tweedy

[11] Patent Number: 4,787,505
[45] Date of Patent: Nov. 29, 1988

[54] WORKPIECE CARRIER ASSEMBLY

[75] Inventor: Mark Tweedy, Mars, Pa.

[73] Assignee: Carl Strutz & Company, Mars, Pa.

[21] Appl. No.: 932,032

[22] Filed: Nov. 18, 1986

[51] Int. Cl.⁴ .............................................. B65G 49/00
[52] U.S. Cl. ........................... 198/803.01; 198/803.01; 198/803.14
[58] Field of Search ............. 198/473.1, 803.01, 803.2, 198/803.11, 803.14

[56] References Cited

U.S. PATENT DOCUMENTS

| | | | |
|---|---|---|---|
| 2,888,127 | 5/1959 | Uhlig | 198/803.14 |
| 3,133,496 | 5/1964 | Dubuit | 198/803.14 |
| 4,088,220 | 5/1978 | Jacksch et al. | 198/803.2 |
| 4,122,939 | 10/1978 | Langen | 198/803.14 |
| 4,464,998 | 8/1984 | Wakabayashi | 198/803.11 |
| 4,475,645 | 10/1984 | Young | 198/803.14 |

*Primary Examiner*—Joseph E. Valenza
*Attorney, Agent, or Firm*—Clifford A. Poff; Thomas H. Murray

[57] ABSTRACT

An adjustable workpiece carrier assembly for carrying workpieces on a conveyor system. Upstanding V-blocks used for supporting workpieces on the assembly, and are changeable so as to allow workpieces of different configurations to be supported thereon. By attaching a plurality of workpiece carrier assemblies to a conveyor system, an automatic conveyor system for conveying a plurality of workpieces in a desired orientation is possible. By simply changing the upstanding V-blocks to conform to the configuration of workpieces, workpieces of different configurations may be conveyed by the same conveyor system.

10 Claims, 2 Drawing Sheets

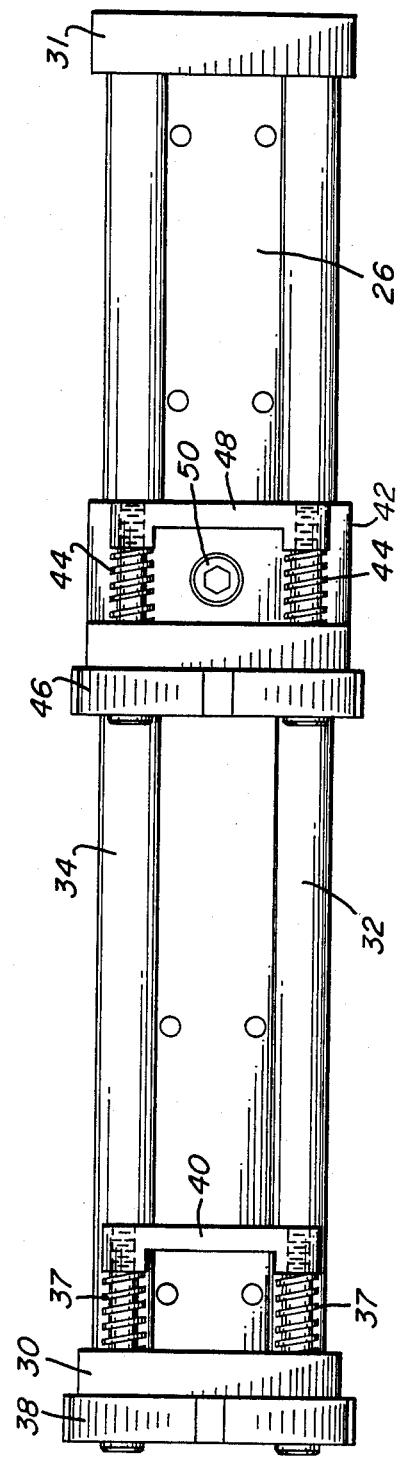

WORKPIECE CARRIER ASSEMBLY

BACKGROUND OF THE INVENTION

1. Field of the Invention

The present invention relates generally to conveyor systems, and more particularly, to a workpiece carrier assembly for carrying a workpiece on a conveyor.

2. Description of the Prior Art

In production facilities, many production lines require identical operations to be performed upon large numbers of identical items. In such situations, use is quite often made of conveyor systems in which individual workpieces are conveyed from an entry location to a work location to a discharge location.

For example, when large numbers of containers must be printed with information thereupon, use of such a conveyor system is most advantageous. By delivering to the conveyor system a plurality of unmarked containers, and by providing a means for positioning each of the plurality of unmarked containers such that each of the containers is delivered to the printing station at a desired orientation relative thereto, the plurality of unmarked containers may be printed with the desired information thereupon in an automated manner.

An automated conveyor system, however, requires a significant capital investment. To justify the cost of such an automated system, use of the system must be more than just occasional. For instance, the costs of such a system may not be justified for automating a work step for a single production line if the production line is only intermittently used, but if the automated system may be adapted for use in the production of more than one product, the additional costs of an automated system may be justified.

For the example of printing information on containers, if an automated conveyor system may be adapted for use thereof for production runs of different sized containers, the cost of an automated system which may otherwise not be justified, may be justifiable. Further, an existing automated conveyor system, if adapted to be capable of being used in production runs of different sized workpieces, would have a greatly improved efficiency.

However, in order to maximize efficiency, the changes which must be made to the conveyor system to allow positioning thereon of differently sized workpieces must be made quickly in order to prevent downtime of the automated system. Existing conveyor systems, however, either preclude the possibility of adapting an automated conveyor system for the positioning thereon of differently sized workpieces, or, allow changes to be made only after extensive downtime.

It is, therefore, an object of the present invention to overcome the disadvantages associated with the prior art.

It is a further object of the present invention to provide an apparatus which allows a plurality of workpieces to be carried on a conveyor system.

It is a still further object of the present invention to provide a workpiece carrier assembly which is adaptable to allow carrying thereon of workpieces of various configurations.

SUMMARY OF THE PRESENT INVENTION

In accordance with the present invention, a workpiece carrier assembly for carrying a workpiece on a conveyor to a work station includes spaced-apart upstanding V-blocks for supporting a workpiece thereupon, support means connected to the upstanding V-blocks for supporting the V-blocks above the conveyor, connecting means for removably connecting the upstanding V-blocks to the support means, and attaching means for attaching the support means in the conveyor. In one embodiment of the present invention, the attaching means includes a base plate having a lengthwise direction perpendicular to the direction of travel of the conveyor and carrier arms fixedly connecting the base plate to the conveyor. In a further embodiment of the present invention, the support means includes carrier rods positioned above the base plate and supported thereabove by chuck members connected to the ends of the rods and to the base plate. At least one chuck member further includes bore holes at an upper portion thereof corresponding to bore holes extending through an upstanding V-block to allow the connecting means, such as spring biased screws, to engage the V-block with the chuck member. An additional, slidable chuck member may be slidably connected along the carrier rods, such slidable member also containing bore holes at an upper portion thereof corresponding to bore holes extending through an additional upstanding V-block to allow the connecting means, such as spring biased screws, to engage the V-block with the slidable chuck member. By attaching the V-blocks t chuck members by spring biased screw members, the V-blocks conforming to the configurations of a particular workpiece may be quickly replaced by V-blocks of other configurations in order to support workpieces of other configurations thereupon.

BRIEF DESCRIPTION OF THE DRAWINGS

The invention may be better understood and further advantages and uses thereof more readily apparent when considered in view of the following detailed description of exemplary embodiments taken with the accompanying drawings in which:

FIG. 2 is a top view of the workpiece carrier assembly illustrated in FIG. 1; and FIG. 3 is a cross-sectional view taken along section I—I of FIG. 1.

DESCRIPTION OF THE PREFERRED EMBODIMENT

Figure 1:
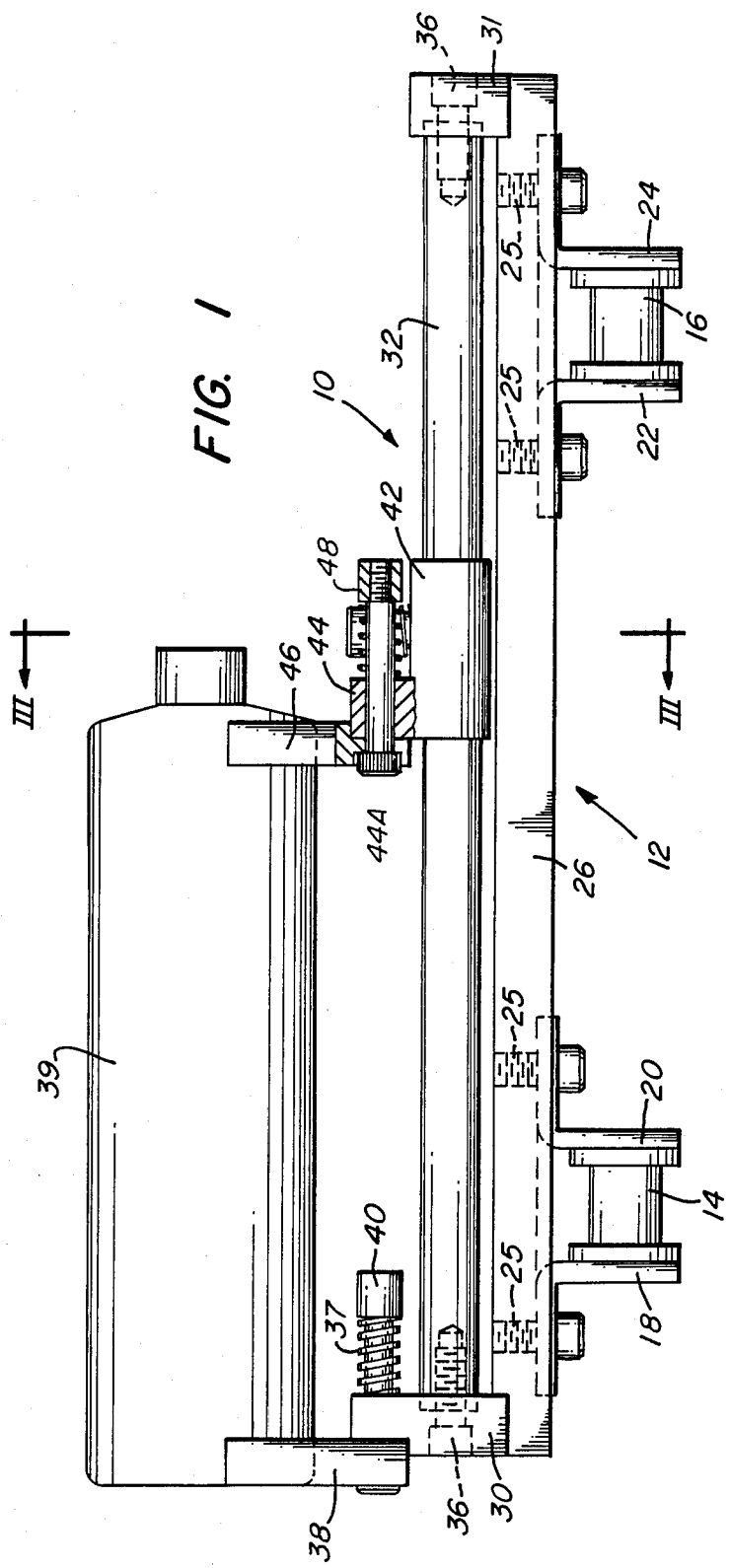
FIG. 1 is a side view of the workpiece carrier assembly of the present invention with a typical workpiece supported thereupon.

Referring now to FIG. 1, there is shown a side view, in elevation, of the workpiece carrier assembly 10 of the present invention. The assembly is mounted upon a conventional endless conveyor 12, (coming out of the page of the illustration of FIG. 1) and includes two chains 14 and 16 rotated about two sets of sprockets (not shown). Attached to chain 14 are two right-angled carrier arms 18 and 20 for attaching one side of the workpiece carrier assembly 10 thereto. Similar such carrier arms are attached to chain 14 at a plurality of other locations to attach Other similar Workpiece carrier assemblies thereto.

Similarly, attached to chain 16 are right-angled carrier arms 22 and 24 for attaching the workpiece carrier assembly thereto. Similar carrier arms are attached to chain 16 at a plurality of other locations to attach other similar workpiece carrier assemblies thereto.

Carrier arms 18, 20, 22, and 24 are each right angled metal plates allowing contact along one portion to the respective chain 14 or 16, and contact along a second portion to the workpiece carrier assembly. The carrier arms may be attached to the respective chains 14 and 16 by any conventional means, such as, for example, threaded screws or rivets. Illustrated in the preferred embodiment of FIG. 1 are screws 25 to threadedly engage the workpiece carrier assembly 10. Conveyor 12, comprising chains 14 and 16 and carrier arms 18–24 are conventional in nature and may be purchased commercially.

Base member 26 of the workpiece carrier assembly 10 spans the distance between chains 14 and 16 of conveyor 12, and provides a means, such as threaded bore holes to engage with screws 25, for attaching carrier arms 18–24 thereto. Suitably attached, base member 26 is thereby caused to move in response to movement of chains 14 and 16 of conveyor 12.

Projecting upwardly from the opposite ends of base member 26 are chuck members 30 and 31. Carrier rods 32 and 34 (rod 34 is illustrated in the overhead view of FIG. 2) span the gap created by the separation distance between chuck members 30 and 31. Bore holes extending through chuck members 30 and 31 and bore holes extending into the opposite ends of carrier rods 32 and 34 allow threaded screw members 36 to attach the rods 32 and 34 to the chuck members 30 and 31 at a desired distance above base member 26. Two bore holes extending through the upper portion of chuck member 30 allow spring biased screw members 37 to extend therethrough and to further extend through corresponding bore holes extending through the bottom portion of a first upstanding V-block 38. The upper surface of block 38 is configured in a V to thereby allow a container 39 to be supported thereupon. Because screw members 37 are spring biased (commonly referred to as "Quick-Lock" or "Quick-Release" screws), applying force to bias the spring allows V-block 38 to be quickly and simply detached from the assembly 10. By further attaching bar 40 across the heads of screw members 37, both springs may be biased simultaneously. Bar 40 is illustrated in the overhead view of FIG. 2.

Referring again t the side view illustration of FIG. 1, there is shown chuck member 42 located between first chuck member 30 and second chuck member 31 Chuck member 42 is illustrated in the cross-sectional view of FIG. 3. Two bore holes extending through member 42 allow a slidable connection with carrier rods 32 and 34. Similar to chuck member 30, chuck member 42 contains bore holes extending through an upper portion thereof to allow spring biased screw members 44 to extend therethrough and to further extend through corresponding slotted and counterbored holes 44A at the bottom portion of right upstanding V-block 46. Because screw members 44 are spring biased, applying force to bias the springs allows V-block 46 to be quickly and simply detached from the assembly 10. By further attaching bar 48, similar to bar 40, across the heads of screw members 42, both springs may be biased simultaneously.

An additional bore hole extends downwardly through chuck member 42, as illustrated in the cross-sectional view of FIG. 3 to allow downwardly extending screw member 50 to extend therethrough Once again, screw member 50 is spring biased. Threadedly engaged at the lower portion of screw member 50 is rectangular nut member 52. The widthwise dimension of the top portion of nut 52 is less than that of the outer widthwise dimension of the bottom portion of rectangular nut 52 causing the outer surfaces of nut 52 to be sloped. Nut member 52 is positioned such as to contact, at two sides of the outer perimeter thereof, with carrier rods 32 and 34. Because of the force exerted by spring biased screw member 50, nut member 52 is thereby caused to be wedged between carrier rods 32 and 34 to thereby lock the chuck member 42 in position at a desired location along the length of carrier rods 32 and 34.

In use, a plurality of workpiece carrier assemblies are attached at spaced locations along the chains 14 and 16 of the conveyor 12 by a plurality of carrier arms 18–24. Upstanding V-bars 38 and 46 having a desired top surface configuration to conform with the configuration of workpiece 39, are secured to chuck members 30 and 46, respectively, by screw members 37 and 44 of each workpiece carrier assembly 10. The conveyor system is thereby provided a means for carrying workpieces of a particular configuration. When workpieces of a different configuration are to be used, the upstanding V-bars 38 and 46 for each workpiece carrier assembly may be quickly and simply replaced, thereby allowing use of the conveyor 12 with containers of many configurations.

While the present invention has been described in connection with the preferred embodiments shown in FIGS. 1–3, it is understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the recitation of the appended claims.

I claim as my invention:

1. A workpiece carrier assembly for carrying a workpiece on a conveyor from an entry location to a work station and thence to a discharge station with said workpiece being positioned at a desired orientation relative to the work station, said assembly including:
   upstanding V-blocks having V-shaped workpiece support surfaces for supporting the workpiece thereupon;
   support means extending transversely of the conveyor for receiving said V-blocks for support by conveyor;
   resiliently operable connecting means for removably connecting said upstanding V-blocks to said support means, said resiliently operable connecting means comprising a screw or bolt supporting each V-block on said support means and a spring biasing one of said V-block and screw or bolt to resiliently clamp said V-block on said support means.

2. The workpiece carrier assembly of claim 1 wherein a first and second upstanding V-block are spaced apart at a distance corresponding to a portion of the workpiece and containing said V-shaped workpiece support surface to conform to the configuration of a workpiece.

3. The workpiece carrier assembly of claim 1 wherein said support means includes a base plate having a lengthwise direction substantially perpendicular to the direction of travel of said conveyor and carrier arms fixedly connecting said base plate to the conveyor.

4. The workpiece carrier assembly of claim 3 wherein said support means includes at least one carrier rod positioned so as to have a longitudinal direction thereof substantially perpendicular to the direction of travel of said conveyor, said connecting means including chuck members connected to said carrier rod for removably supporting said V-blocks.

5. The workpiece carrier assembly of claim 4 wherein a first chuck member and a second chuck member are positioned at a first end and a second end, respectively, of said carrier rod, said first and second chuck members are fixedly connected to said carrier rod and to said base plate to thereby support said carrier rod in an aligned relation to the base plate, and wherein at least one chuck member further includes a projection extending beyond the carrier rod, said projection containing bore holes corresponding to bore holes extending through an upstanding V-block to allow said connecting means to engage said V-block and said chuck member.

6. The workpiece carrier assembly of claim 4 wherein at least one chuck member is slidably connected to said carrier rod, and is positioned along the length thereof, said chuck member containing a projection extending beyond the carrier rod, said projection containing bore holes corresponding to bore holes extending through an upstanding V-block to allow said connecting means engage said V-block and said chuck member.

7. The workpiece carrier assembly of claim 6 wherein said chuck member further includes a downwardly extending bore hole to allow a screw member to pass therethrough and a nut member positioned so as to allow engagement with said screw member and a portion of said carrier rod to allow said chuck member to be fixed in position along the length of the carrier rod.

8. A workpiece carrier assembly for carrying a workpiece on a conveyor from an entry location to a work station and thence to a discharge station with said workpiece being positioned at a desired orientation relative to the work station, said assembly including:

a base plate having a lengthwise direction substantially perpendicular to the direction of travel of said conveyor, and carrier arms fixedly connecting the base plate to the conveyor;

first and second spaced apart upstanding V-blocks for supporting the workpiece thereupon with each of said V-blocks containing bore hole extending through the bottom portions thereof;

a first carrier rod and a second carrier rod positioned side-by-side and spaced apart by a certain distance, with the longitudinal directions thereof substantially perpendicular to the direction of travel of said conveyor;

a first chuck member and a second chuck member, said first and second chuck members positioned at a first end and a second end, respectively, of the carrier rods, said first and second chuck members are fixedly connected to said carrier rods and to said base plate to thereby support said carrier rods in an aligned relation to the base plate and wherein said first chuck member includes a projection extending beyond the carrier rods, said projection containing bore holes corresponding to said bore holes extending through said first upstanding V-block to allow spring biased screw members to engage the first chuck member with the first upstanding V-block;

a slidable chuck member slidably connected to said carrier rods and positioned along the length thereof, said slidable chuck member containing a projection extending beyond the carrier rods, said projection containing bore holes corresponding to said bore holes extending through said second upstanding V-block to allow spring biased screw members to engage said second upstanding V-block and said slidable chuck member; and a downwardly extending bore hole extending through the slidable chuck member; and a downwardly extending screw member extending through said downwardly extending hole of the slidable chuck member and a nut member threadedly engaged with the downwardly extending screw member, said nut member further engaged with portions of said carrier rods to thereby allow fixing in position of the slidable chuck member at a desired location along the length of the carrier rods.

9. The workpiece carrier assembly according to claim 1 wherein said resiliently operable connecting means includes a wedge member carried by a chuck member for releasable connection to said support means.

10. The workpiece carrier assembly according to claim 9 wherein said resiliently operable connecting means includes a spring biased member for interconnecting said wedge member and said chuck member.

* * * * *